United States Patent Office 3,475,308
Patented Oct. 28, 1969

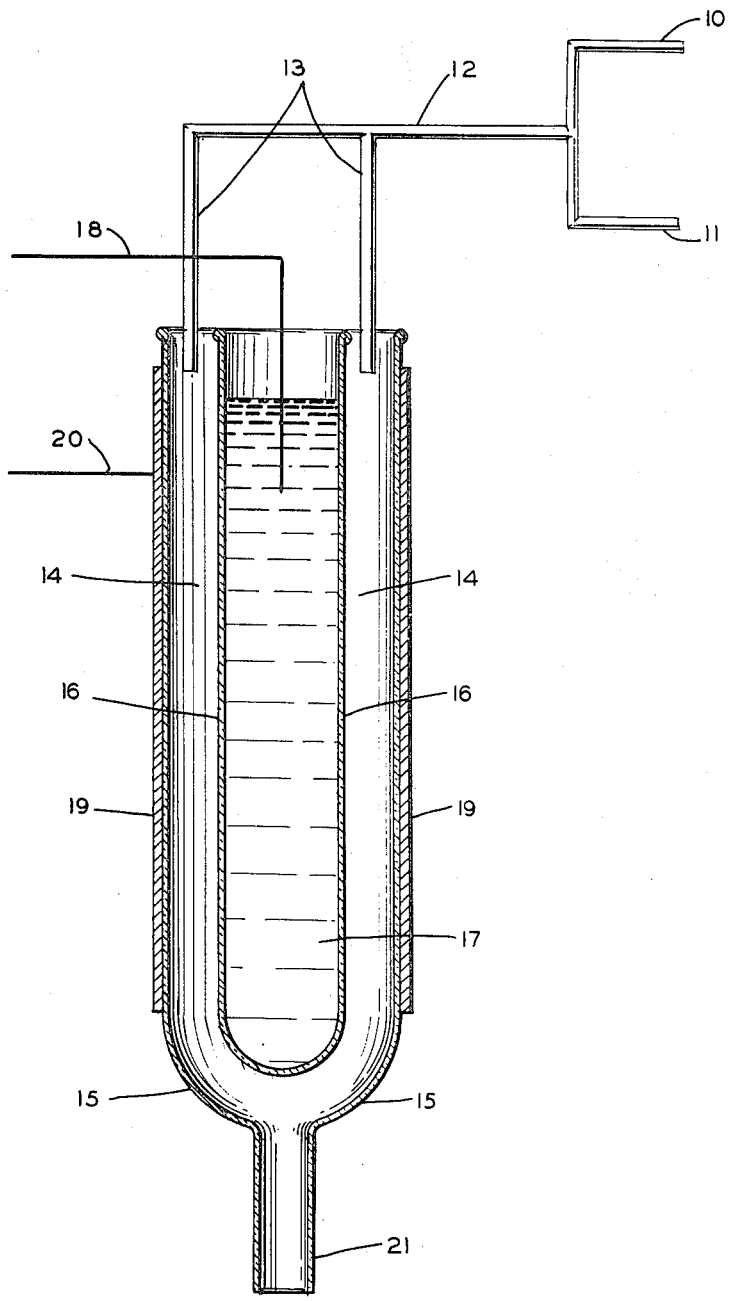

3,475,308
PREPARATION OF ALKYLENE OXIDES IN A SILENT ELECTRIC DISCHARGE
James C. Burleson, St. Charles, and William F. Yates, Chesterfield, Mo., assignors to Monsanto Company, St. Louis, Mo., a corporation of Delaware
Filed Jan. 3, 1967, Ser. No. 606,616
Int. Cl. B01k 1/00
U.S. Cl. 204—169                                    6 Claims

ABSTRACT OF THE DISCLOSURE

Alkylene oxides such as ethylene oxide and propylene oxide are prepared by subjecting gaseous mixtures of an olefin having a carbon chain with a corresponding number of carbon atoms and carbon dioxide under select conditions to a silent discharge.

The present invention relates to a new process for the preparation of alkylene oxides. More particularly, the present invention relates to a new and novel method for non-catalytically preparing alkylene oxides from carbon dioxide and aliphatic olefin hydrocarbons.

The alkylene oxides such as ethylene oxide and propylene oxide are extensively used in the preparation of many useful compositions. Particularly, the alkylene oxides are useful in the preparation of the corresponding glycols, alkanolamines and nitriles. These alkylene oxides have been prepared to a large extent by the catalytic oxidation of an olefin hydrocarbon or, in some instances, through the dehydrochlorination of the corresponding alkylene chlorohydrin by the use of a base compound. While these methods of producing alkylene oxides, particularly the former method, have been found to be quite useful, there is still need for additional methods whereby the alkylene oxides may be prepared.

It is an object of the present invention to provide a new and useful method for the preparation of alkylene oxides. Another object of the present invention is to provide a new and novel non-catalytic process for the preparation of alkylene oxides. An additional object of the present invention is to provide a new and novel process whereby alkylene oxides may be prepared by the non-catalytic direct reaction of carbon dioxide and an aliphatic olefin hydrocarbon. Additional objects will become apparent from the following description of the invention herein disclosed.

The present invention, which fulfills these and other objects, is a process for the preparation of alkylene oxides which comprises subjecting a mixture of carbon dioxide and at least one aliphatic olefin hydrocarbon to a silent electric discharge. By the term "silent electric discharge," as used herein is meant an electrical discharge of the silent type characterized by a relatively high voltage, a relatively low current density and a relatively low gas temperature as contrasted to the low voltage, high current, and high temperatures of the arc discharge.

In order to further describe the present invention, reference is made to the accompanying drawing which is a diagrammatic representation of an apparatus particularly suited to carrying out the process of the present invention. Referring to the drawing, carbon dioxide and an aliphatic olefin hydrocarbon are fed through lines 10 and 11, respectively, into a common line 12 wherein these components become intimately mixed. The mixture passes through line 12 into one or a plurality of distributing tubes 13 which serve to introduce the mixture into reaction chamber 14. Reaction chamber 14 is formed by the annular space between a glass outer tube 15 and glass inner tube 16, which glass inner tube 16 is sealed at its lower end and filled with an electrolyte solution 17 which may be any suitable conducting solution. Glass outer tube 16 is surrounded by a conducting material 19 usually as a sheet of a conducting metal such as, for example, aluminum foil. Electrolyte solution 17 and conducting metal 19 are connected by means of conducting wires 18 and 20, respectively, with an electrical power source (not shown). The electrical power source is one capable of supplying as high as 20,000 volts and higher of alternating current with a frequency range of 30 cycles to 2 megacycles per second. The gas mixture introduced through lines 13 into reaction chamber 14 passes downward through reactor chamber 14 and a high intensity electrical field created by a silent electrical discharge between electrolyte 17 and conducting material 19. The effluent of reaction chamber 14 is discharged through discharge tube 21 whereby it flows to a recovery system (not shown).

To further describe and to specifically illustrate the process of the present invention, the following examples are presented. These examples are not to be construed as limiting of the present invention.

EXAMPLE I

Carbon dioxide and ethylene were mixed in equimolar quantities and subjected to a silent electrical discharge in an apparatus substantially as shown in the accompanying drawing. In this apparatus, aluminum foil was used as conducting material 19 surrounding outer tube 15 and a 1% $Na_2SO_4$ solution was used as electrolyte 17 within glass inner tube 16. The distance between glass inner tube 16 and glass outer tube 15 was 1.5 mm. The carbon dioxide-ethylene mixture was subjected to the silent discharge at substantially atmospheric pressure and at room temperature (70–80° F.). The voltage applied to the silent electric discharge was approximately 15,000 volts and the frequency of the applied electromotive force was approximately 60 cycles per second. The field strength within the silent electric discharge within the reaction zone was 100,000 volts per centimeter. The residence time of the reaction mixture within the field of the silent electric discharge was approximately 60 seconds. On analysis of the effluent from the silent electric discharge apparatus, it was found that a significant quantity of ethylene oxide, representing approximately 30% by weight of the total reaction product, was formed. In addition, minor amounts of polyolefin oils were found to have formed.

EXAMPLE II

Example I was substantially repeated with the exception that propylene was used as the olefin hydrocarbon. In this experiment, the principal product was propylene oxide representing approximately 50% by weight of the reaction product. Minor amounts of propylene dimer and allyl alcohol were found to have been produced.

EXAMPLE III

Example I is again substantially repeated with the exception that the olefin hydrocarbon is hexene-1. A good yield of hexylene oxide is obtained.

The feed materials to the process of the present invention consist of carbon dioxide and at least one olefin hydrocarbon. Most often, the carbon dioxide and olefin hydrocarbon are employed in a molar ratio of carbon dioxide to olefin hydrocarbon within the range of 1:10 to 10:1. However, both higher and lower ratios may be used if desired. Since formation of the alkylene oxide from the carbon dioxide and olefin hydrocarbon generally requires one mol of each of the reactants, it is usually preferred to employ these reactants in a molar ratio of carbon dioxide to olefin hydrocarbon within the range of 1:5 to 5:1, preferably substantially equimolar quantities being used.

Olefin hydrocarbons used in carrying out the process of the present invention include a wide range of such hydrocarbons. Both straight chain and branched chain olefin hydrocarbons may be used. In addition, it is within the scope of the present invention to use cyclic olefins in the present process. The olefin hydrocarbons may be terminally or internally unsaturated. Non-limiting examples of olefin hydrocarbons useful in the process of the present invention are ethylene, propylene, n-butylene, 3-methylbutene-1, n-pentenes, n-hexenes, dimethylbutenes, n-heptenes, methyl hexenes, methyl heptenes, methyl ethyl hexenes, n-nonenes, dimethyl octenes, methyl octenes, n-decenes, dimethyl decenes, methyl undecenes, cyclohexene, and the like, up to and including olefin hydrocarbons of 20 carbon atoms and higher. Since the process of the present invention requires the reactants to be in the gaseous phase, those olefin hydrocarbons which may be readily gasified are usually more desired as feeds for the practice of the present invention. As a practical matter, the most useful olefin hydrocarbon feeds to the process of the present invention are those containing 2 to 10 carbon atoms per molecule. These may be either straight chain or branched chain and may be used singly or in admixture with one another. With respect to choosing the olefin hydrocarbon feed to the process of the present invention, it should be considered that the oxygen inserted into the olefin hydrocarbon by the present process will be inserted between the carbon atoms adjacent to the point of unsaturation in the olefin hydrocarbon chain. Therefore, the choice of olefin will to a large extent depend upon the product desired.

The flow rate of the carbon dioxide-olefin hydrocarbon feed mixture through the high intensity electric field produced by the silent electric discharge most often is such as to result in a residence time of the mixture within said high intensity electric field of 5 to 200 seconds. Preferably, however, flow rates or other conditions, are adjusted to provide a residence time of 30 to 100 seconds of the reactant mixture within the high intensity electric field.

The electrical conducting media through which the silent electric discharge is generated may consist of any material which may act as electrodes. Such materials are well known to the art and include various metals such as the aluminum foil mentioned above or various electrolytic solutions such as the above-mentioned sodium sulfate solution. The two electrical conducting media used may be the same or different depending upon the configuration and construction of the apparatus used in carrying out the process of the present invention. Since materials and electrolytic solutions capable of conducting electricity and of acting as electrodes are well known to the art, no further discussion of such conducting media is believed necessary.

An insulating medium generally is required between the two electrodes employed in providing the silent electric discharge of the process of the present invention. In the apparatus shown in the accompanying drawing, this insulating medium is provided by glass tubes 15 and 16 which each provide a layer of glass between the electrodes. It is not necessary that the electrodes be insulated from one another by two layers of insulation as in the apparatus of the drawing. It is only necessary that one insulating medium be provided and the reactants may be in direct contact wtih one of the electrodes. The choice of the insulating medium is not critical and is well within the ability of those skilled in the art. It is only necessary that the insulating material have a dielectric greater than that of the gaseous reactants. Included within this group of insulating materials are glass, various ceramic materials and the like.

In providing the silent electric discharge of the process of the present invention, a field strength voltage from about 20,000 to 150,000 volts per centimeter most often is required. "Field strength," as used herein, is the value obtained by dividing the voltage applied to the electrodes by the distance between the two electrodes and is a measure of the electromotive force within the reaction zone. The field strength required will vary somewhat with the distance between the electrodes, the residence time and the reactants involved, as well as the efficiency of contact of the reaction mixture with the high intensity electrical field generated by the silent electric discharge. A preferred field strength for operation of the process of the present invention is one within the range of 30,000 to 125,000 volts. Generally, the frequency of the electric current in the operation of the present process is within the range of 30 cycles to 2-megacycles per second. However, a frequency within the range of 30 to 60 cycles per second is preferred.

The apparatus used in carrying out the process of the present invention may vary considerably. Any apparatus which presents a silent electric discharge across a gap through which the reaction mixture of the present process may be passed will suffice. The gap between the electrodes may vary considerably in distance and is not critical so long as a silent electric discharge of the proper strength can be obtained. This distance, of course, will vary to some extent with the electrodes used and other considerations well within the ability of those skilled in the art. A useful apparatus is one of the general configurations illustrated by the accompanying drawing. Of course, any number of variations of such an apparatus may be used without departing in any manner of the spirit and scope of the present invention. The primary concern is to provide an apparatus which is consistent with efficient utilization of the electrical energy. The construction of such an apparatus, again, is well within the ability of those skilled in the art.

The reaction conditions of temperature and pressure at which the present invention may be operated may vary considerably and are not particularly critical to the operation of the present invention. With respect to temperature, no higher temperatures are necessary than are required to vaporize the olefin hydrocarbons in the feed. If normally gaseous hydrocarbons are used, ambient temperatures (70 to 80° F.) may be used for operation of the process of the present invention. As a practical matter, temperatures above 400° F. will seldom be used in the operation of the process of the present invention. Generally, the temperatures employed are within the range of 60 to 200° F. With regard to pressure, the operation of the present process is most often at substantially atmospheric pressure, i.e., 0 to 5 p.s.i.g. However, both higher and lower pressures, i.e., 10 mm. Hg to 50 p.s.i.a. may be used if desired, the primary consideration in the use of pressure being that the reaction mixture must be in the gaseous phase.

What is claimed is:

1. A process for the manufacture of alkylene oxides which comprises subjecting a mixture of carbon dioxide and at least one olefin hydrocarbon in mole proportions so as to produce said alkylene oxide to a silent electric discharge having a field strength in the range of 20,000 to 150,000 volts per centimeter and wherein the reaction is carried out at a temperature of less than 400° F. and a pressure with the range of 10 mm. Hg to 50 p.s.i.a.; and wherein the residence time of the reactants is within the range of 5 to 200 seconds.

2. The process of claim 1 wherein the carbon dioxide and olefin hydrocarbon are in a molar ratio of 1:10 to 10:1.

3. The process of claim 1 wherein the frequency of the silent electric discharge is within the range of 30 cycles to 2 megacycles per second.

4. The process of claim 1 wherein said mixture contains approximately equimolar quantities of carbon dioxide and olefin hydrocarbon.

5. The process of claim 1 wherein the olefin hydrocarbons have less than 20 carbon atoms per molecule.

6. The process of claim 5 wherein in the olefin hydrocarbons have 2 to 10 carbon atoms per molecule.

References Cited

UNITED STATES PATENTS

| | | | |
|---|---|---|---|
| 1,986,885 | 1/1935 | Finlayson et al. | 204—169 |
| 3,099,613 | 7/1963 | Bartok et al. | 204—162 |
| 3,205,162 | 9/1965 | MacLean | 204—177 |
| 3,312,719 | 4/1967 | Hullstrung et al. | 260—348.5 |

FOREIGN PATENTS 353,455   7/1931   Great Britain.

ROBERT K. MIHALEK, Primary Examiner

U.S. Cl. X.R.

260—348.5